May 9, 1950     W. J. KUEHN ET AL     2,506,722
SLIDABLE TYPE DRAIN COCK
Filed Oct. 30, 1944
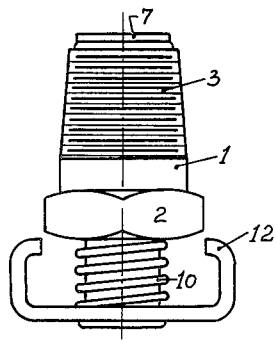
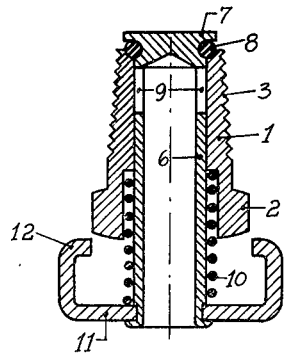
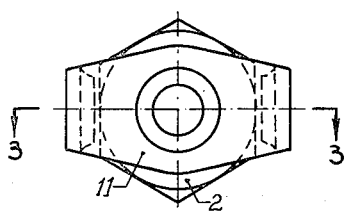
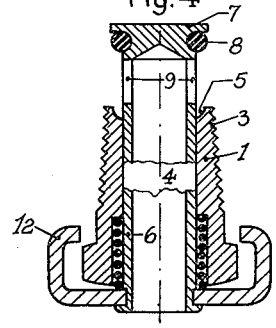
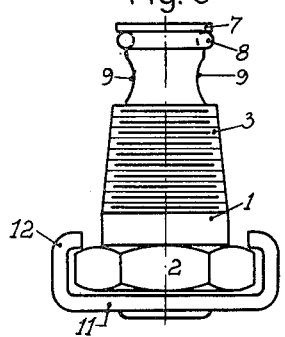
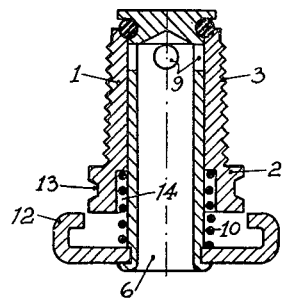
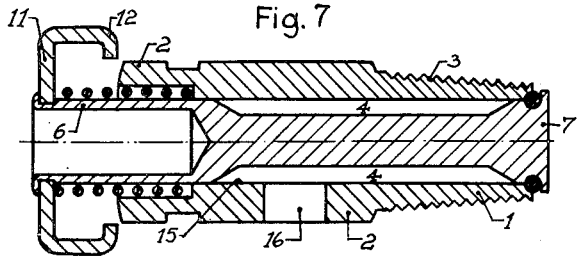
INVENTOR.
William J. Kuehn and
Louis R. Zehnder
BY Arthur H. Robert
atty.

Patented May 9, 1950

2,506,722

UNITED STATES PATENT OFFICE 2,506,722

SLIDABLE TYPE DRAIN COCK

William J. Kuehn and Louis R. Zehnder, Louisville, Ky., assignors, by mesne assignments, to The Weatherhead Company, a corporation of Ohio Application October 30, 1944, Serial No. 561,111

1 Claim. (Cl. 137—34)

This invention relates to drain cocks of the type comprising: an externally-threaded open-ended tubular plug having an external polygonal nut or tool engaging section at its outer end and presenting a longitudinal drainage bore with a valve seat adjacent the inner end of the bore; and a valve member extending longitudinally through the drainage bore with its outer end projecting from the outer end of the bore and with its inner end providing a valve head which cooperates with the valve seat to form a valve controlling the opening and closing of the bore, the valve member being movable along the bore between an outer valve-closed position and an inner valve-open position. Drain cocks of this general type are universally employed on present day aircraft.

The proper maintenance of the modern aircraft requires frequent inspection and servicing operations during each of which it is desirable to open and close each drain cock and during some of which it may be necessary to replace or tighten one or more of them. Because of this and because of the multitude of drain cocks on each aircraft, in order to facilitate maintenance and reduce weight and surface obstruction to a minimum, it is desirable: that each drain cock be of minimum weight; that it afford minimum surface obstruction; that its polygonal nut be readily accessible for replacement and tightening purposes; and that its valve member be easy to open, close and lock in or release from the open position, quickly without at the same time being readily opened by accident, vibration or the like.

In a screw type drain cock heretofore widely used, the valve member was threaded to the bore of the tubular plug and provided at its outer end with a crossbar for turning it between open and closed positions. This arrangement was objectionable because the crossbar had to be wired to the aircraft to avoid accidental opening of the cock and the use of wires necessitated wire cutting and rewiring operations on each cock during each maintenance operation requiring manipulation of the cock. To avoid wiring, the use of a lock nut between the crossbar and the polygonal nut was proposed but this increased the weight and obstruction of the cock, interfered with access to the polygonal nut, and still required considerable manipulation of the cock in opening and closing it.

In a slidable type proposed, the valve member was slidably mounted in the bore and resiliently urged to the closed position while the outer end of the plug was forked to support a cam for moving the valve member to and locking it in the open position. This arrangement objectionably increases the weight and obstruction of the cock. To avoid the weight and obstruction of the fork and cam, it has been proposed to arrange the valve member so that, when manually depressed to the open position, it could be rotated into threaded engagement with the bore to lock the valve open but this involves objectionable manipulation with still enough obstruction to be objectionable.

All the foregoing arrangements are representative of the intensive development which drain cocks have undergone, without yet producing one satisfactorily meeting all requirements.

The principal object of the present invention is to provide a drain cock which meets all requirements in a highly satisfactory manner.

Another object is to provide a novel, simple and inexpensive form of drain cock which is of minimum weight, affords minimum surface obstruction, leaves the polygonal nut readily accessible, and is easy to open, close and lock in or release from its open position, quickly without being readily opened by accident, vibration or the like.

We have found that these objectives can be attained in the slidable type of cock by providing the slidably-mounted, resiliently-urged valve member with an outer transverse crossbar whose width is sufficiently narrow to leave the head or nut accessible and whose ends are inturned to an extent such as to clear the sides of the polygonal nut, but not the corners thereof. With this arrangement the valve can be momentarily opened and closed simply by positioning the inturned ends of the crossbar along the sides of the nut and then manually depressing and releasing the valve member. To lock the valve in, or release it from, the open position, it is only necessary to turn the cross member to the slight extent required to place its inturned end over, or remove them from, the adjacent corners of the polygonal nut.

The invention is illustrated in the accompanying drawing wherein:

Figure 1 is a side elevation with the ends of the crossbar in position to clear the sides of the nut;

Figure 2 is a corresponding view of the outer end of the assembly;

Figure 3 is a section taken along line 3—3 of Figure 2;

Figure 4 is a partly broken similar view with the valve depressed to the open unlocked position;

Figure 5 is a side elevation with the valve locked in the open position;

Figure 6 shows a modification in section corresponding to Figure 3; and

Figure 7 similarly shows another modification.

The drain cock shown in the drawing conventionally includes: an open ended tubular plug 1 externally presenting an external polygonal nut or tool engaging section 2 at its outer end and external tapered pipe threads 3 between the nut 2 and its inner end, and internally presenting an open ended longitudinal drainage bore 4 with a valve seat 5 adjacent the inner end of the bore; a rotatable valve member 6 in the form of a cylindrical sleeve (6) slidably fitting the bore and extending longitudinally therethrough with its outer end projecting from the outer end of the bore and with its inner end providing a valve head 7 which carries a rubber or other resilient ring packing 8 and cooperates with the valve seat 5 to form a valve controlling the opening and closing of the bore through peripheral drainage openings 9 in the sleeve adjacent the head, the valve member 6 being manually depressible inwardly along the bore from an outer valve-closed position to an inner valve-open position; resilient means, in the form of a spring 10, arranged between the plug 1 and valve member 6 to urge the valve member outwardly to the valve-closed position; and a crossbar or yoke 11 rigidly anchored to and bodily carried by, the outer end of the valve member 6. The valve member 6 may be made non-rotatable and the crossbar 11 rotatably mounted upon its outer end but the arrangement shown is normally preferred.

In accordance with our invention, the crossbar 11 is made sufficiently narrow, preferably narrower than the nut 2, to expose the head and render it accessible, that is to say engageable by a tool for tightening the valve housing or removing and replacing it, while the crossbar end portions 12 are inturned to an extent such that they can barely clear the sides of the nut 2 when moved inwardly or outwardly but cannot clear the corners of the nut. When the inturned ends 12 of the crossbar 11 are positioned, relatively to the ends of the nut 2, to extend adjacent the straight sides of the nut, the valve can be momentarily opened simply by manually depressing the valve member 6 to its innermost position and then releasing it, permitting the spring 10 to snap it back into the closed position. To lock it in the open position, it is necessary only to depress the crossbar 11 and then rotate it to the slight degree necessary to place the inturned ends of the bar across the radially extending or transverse shoulder surfaces provided by diametrically opposed corners of the nut, which block the return movement to the valve-closed position. With a six sided nut, for example, a turn ranging from slightly less to slightly more than 30° is sufficient to lock it in, or release it from, the open position.

In the assembly shown in Figures 1 through 5, since the inturned arms 12 engage the inner end face of the nut in the locked position, a clearance sufficient to accommodate the arms must be provided between the inner face of the nut and adjacent parts of the aircraft. This assembly affords a certain degree of obstruction on the surface of the aircraft. Where this degree of obstruction is objectionable, it may be reduced by decreasing the extent of the inward and outward movements required to open and close the valve to a degree such that the inturned ends 12 extend, in the closed position of the valve, about midway along the straight sides of the nut instead of at the outer end of the nut, or by using the modified form shown in Figure 6.

In Figure 6, the external threads 3 are extended up to the inner end of the nut 2 so that the plug may be screwed into flush engagement with the wall forming the plug receiving opening. In addition, the nut 2 is provided with a peripheral groove 13, while the valve opening movement is reduced to a degree such that the inturned ends 12 are aligned with the groove 13 in the valve-open position whereby they may be rotated along the groove between the valve locking and releasing positions. The arrangement shown in Figure 6 makes possible a substantial reduction in the degree to which the cock assembly projects outwardly from the wall in which it is secured. For example, the assembly of Figure 6 reduces the outward projection of the assembly of Figure 1 from 30 to 40%.

In further accordance with our invention, the bore of the plug 1 is enlarged substantially within the confines of nut 2 to provide a space 14 to receive spring 10. In this way the strength of the plug 1 is preserved without increasing its diameter or its wall thickness along the threaded portion.

It will be readily appreciated that our invention enables the production of a simple and inexpensive form of drain cock which is of minimum weight, affords very little surface obstruction, leaves the polygonal nut readily accessible, and is easy to open, close and lock in, or release from its open position, quickly without being readily opened by accident, vibration or the like. It will be appreciated also that the cock may be opened, closed and locked or released when blindly manipulated by the operator. In other words, it is not necessary for the operator to look at the cock while performing any of these operations.

The invention may, of course, be applied to other uses besides aircraft. In other uses, where weight and degree of surface obstruction are not so important, as is the case in automobiles, for example, the cock may be modified somewhat to suit special requirements. Both structures shown in Figures 1–6 are vertically positioned and arranged to provide end drainage. In some other uses it may be desirable to position the cock horizontally and arrange it for side drainage. A cock of this character is illustrated in Figure 7.

In Figure 7, the nut 2 is elongated to provide a bearing surface 15 for the valve member and to accommodate the side drainage outlet opening 16. In addition, the diameter of the valve member 6 between the valve head 7 and side drainage opening 16 is reduced to permit a drainage flow directly through the drainage bore from the valve opening to the opening 16. Except for these changes, the cock of Figure 7 is substantially identical in structure and operation to those of Figures 1–6.

All three cocks of Figures 1–7 close when the valve member moves outwardly. This is desirable, although not essential, in all uses where the liquid involved is under pressure because such pressure tends to force the valve into the closed position. The invention, however, is not limited to an outwardly closing valve, but may, on the contrary, be readily applied to an inwardly closing valve.

Having described our invention, we claim:

A drain valve comprising an externally threaded tubular housing adapted to be received in a cooperating member and having a bore extending axially therethrough, said housing at its outer end having a non-circular head formed with opposed wrench engaging flats, said housing being formed with a valve seat at its inner end, a valve member axially movable in said bore projecting through the outer end of said housing and carrying a valve for cooperation with said seat, and a radially extending cross-bar secured to the projecting outer end of said valve member, said cross-bar having an axially inwardly extending end portion terminating in a radially inturned end, said inturned end being spaced radially from said valve a distance greater than the radial dimension of said head at its points of minimum diameter and less than the radial dimension of said head at its points of maximum diameter whereby said inturned end may be moved axially past the portions of said head of minimum diameter and engage under the portions of maximum diameter, when turned, to lock the valve in unseated position, said cross-bar and inturned end being narrower than the portions of minimum diameter of said head so as to expose at least two opposite wrench engaging flats when said valve is in either open or closed position.

WILLIAM J. KUEHN.
LOUIS R. ZEHNDER.

REFERENCES CITED

The following references are of record in the file of this patent:

UNITED STATES PATENTS

| Number | Name | Date |
| --- | --- | --- |
| 1,080,273 | Fountain | Dec. 2, 1913 |
| 1,463,735 | Varrieur | July 31, 1923 |
| 1,788,290 | Green | Jan. 6, 1931 |
| 1,954,986 | Carlson | Apr. 17, 1934 |

FOREIGN PATENTS

| Number | Country | Date |
| --- | --- | --- |
| 139,292 | Great Britain | of 1919 |